US010779160B2

(12) United States Patent
Huang et al.

(10) Patent No.: US 10,779,160 B2
(45) Date of Patent: Sep. 15, 2020

(54) METHOD AND DEVICE FOR UPDATING USER DEVICES VIA A CELLULAR CONNECTION

(71) Applicant: Verizon Patent and Licensing Inc., Arlington, VA (US)

(72) Inventors: Ye Huang, San Ramon, CA (US); Jin Yang, Orinda, CA (US); Stephen J. Kolanowski, Keller, TX (US); Bjorn Hjelm, Livermore, CA (US); Stephane Chaysinh, Basking Ridge, NJ (US); Martin A. Iroff, Alpharetta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 88 days.

(21) Appl. No.: 16/221,913

(22) Filed: Dec. 17, 2018

(65) Prior Publication Data

US 2020/0196134 A1 Jun. 18, 2020

(51) Int. Cl.

| | |
|---|---|
| ***H04W 8/24*** | (2009.01) |
| ***H04L 5/00*** | (2006.01) |
| ***H04W 76/11*** | (2018.01) |
| ***H04W 92/10*** | (2009.01) |
| ***H04W 88/08*** | (2009.01) |
| ***H04W 8/08*** | (2009.01) |
| ***H04W 88/02*** | (2009.01) |

(52) U.S. Cl.

CPC .......... *H04W 8/245* (2013.01); *H04L 5/0055* (2013.01); *H04W 8/08* (2013.01); *H04W 76/11* (2018.02); *H04W 88/023* (2013.01); *H04W 88/08* (2013.01); *H04W 92/10* (2013.01)

(58) Field of Classification Search

None

See application file for complete search history.

(56) References Cited

U.S. PATENT DOCUMENTS

| | | | | |
|---|---|---|---|---|
| 2016/0286385 | A1* | 9/2016 | Ryu | H04W 68/00 |
| 2018/0270188 | A1* | 9/2018 | Kodaypak | H04L 63/0428 |
| 2020/0112921 | A1* | 4/2020 | Han | H04W 76/27 |

OTHER PUBLICATIONS

SA WG2 Meeting #106, S2-144133, Nov. 17-21, 2014, San Francisco, California, USA (Year: 2014).*

* cited by examiner

*Primary Examiner* — Alex Skripnikov

(57) ABSTRACT

A device obtains a data structure from a computing device, and divides the data structure into data segments. The device obtains a list of user devices from the computing device and obtains, from one or more network devices, a respective location and a respective reachability of each user device. The device determines, based on the respective location of each user device, a set of user devices connected to a base station. The device determines a communication capability of the base station, and determines, based on the communication capability, a subset of the set of user devices and one or more sets of the data segments. The device sends, based on the respective reachability of each user device of the subset of user devices, the one or more sets of data segments to the subset of user devices via the base station.

20 Claims, 10 Drawing Sheets

100

User Device
102-1
gNB/eNB
104-1
AMF/MME
106-1
118-1
Location and/or reachability of user device 102-1
116-1
NEF/SCEF
108
120
Server
110
116-N
User Device
102-L
gNB/eNB
104-M
AMF/MME
106-N
118-N
Location and/or reachability of user device 102-N 100
User Device
102-1
gNB/eNB
104-1
AMF/MME
106-1
NEF/SCEF
108
Server
110
AMF/MME
106-N
gNB/eNB
104-M
User Device
102-L 100
User Device 102-1
User Device 102-L
138
136
140
134
gNB/eNB 104-1
gNB/eNB 104-M
AMF/MME 106-1
AMF/MME 106-N
142
Acknowledgement
Data segment(s)
132
NEF/SCEF 108
144
Server 110

200

Example Information 202

| Job | # of segments | % of UE | Progress |
|---|---|---|---|
| 1 | 20 | 20% | 18/20 |
| 2 | 15 | | |

Example Information 204

| Cell-ID | # of devices | Serving AMF/MME | Device IDs |
|---|---|---|---|
| 101 | 607 | M100 | 100001,100002,10003... |
| 202 | 1001 | M200 | 200001,200002,30003... |

Example Information 206

| Cell-ID | Reach-able | Availability Time | Serving AMF/MME | Image Segment list refs | Current seg status | Final status |
|---|---|---|---|---|---|---|
| 101 | 607 | M100 | M-100 | 100001,100002,10003... | Fail | False |
| 202 | 1001 | M200 | M-200 | 200001,200002,30003... | Success | True |

FIG. 2A

METHOD AND DEVICE FOR UPDATING USER DEVICES VIA A CELLULAR CONNECTION

BACKGROUND

An Internet of Things (IoT) device, such as a category M1 (Cat-M1) device, may be powered by a battery. The IoT device may employ one or more strategies, such as an extended discontinuous repetition (eDRX) strategy, a power saving mode (PSM) strategy, and/or the like, to reduce power consumption and extend the life of the battery.

BRIEF DESCRIPTION OF THE DRAWINGS

FIGS. 2A-2B are diagrams that show example information that may be stored by one or more devices of FIG. 1 and example messages capable of being communicated by one or more devices of FIG. 1.

DETAILED DESCRIPTION OF PREFERRED EMBODIMENTS

Figure 1A:
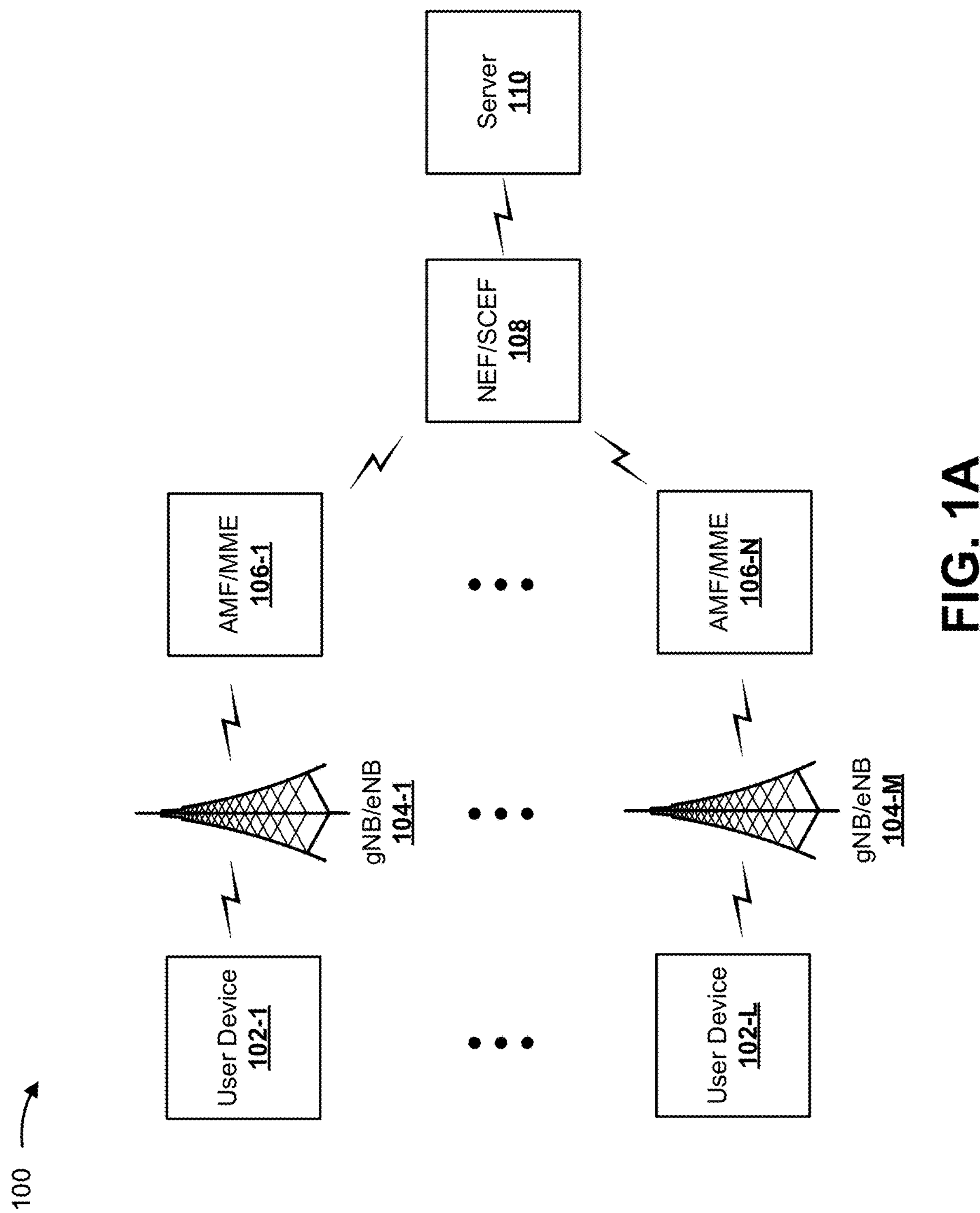
FIGS. 1A-1E are diagrams of one or more example implementations described herein.

The following detailed description of example implementations refers to the accompanying drawings. The same reference numbers in different drawings may identify the same or similar elements.

In some cases, an Internet of Things (IoT) device, such as a category M1 (Cat-M1) device, uses a battery as a primary source of power for the IoT device. Some IoT devices use one or more power saving strategies, such as an extended discontinuous repetition (eDRX) strategy, a power saving mode (PSM) strategy, and/or the like, to extend the life of the battery. However, these strategies may limit the availability of the IoT device to send and/or receive information (e.g., by using small paging windows, increasing idle time, extending sleep time, and/or the like). In some cases, a server device or other network elements, such as a server device associated with the manufacturer of the IoT device, sends information to the IoT device, such as an upgrade image file, but the IoT device cannot receive the information because the IoT device is not reachable for a long enough period to receive the information. Further, in some cases, the server device and/or other network devices continue to try to deliver the information to the IoT device, even when the IoT device is not reachable, which can tie up and/or waste network resources. Moreover, in some cases, the server device attempts to simultaneously send the information to a plurality of IoT devices that are concentrated in a particular area at the same time, this may overwhelm the network devices dedicated to that particular area.

Some implementations described herein provide a device that divides a data structure into a plurality of data segments and incrementally sends the plurality of data segments to a reachable subset of user devices (e.g., IoT devices) of a set of user devices associated with a base station. This ensures that one or more data segments of the plurality of data segments are only sent when a user device of the subset of user devices is reachable, which allows the user device to receive the data structure a data segment at a time without overwhelming a network, or one or more network devices of the network, associated with the user device. In some implementations, the device obtains the data structure and a list of a plurality of user devices from a server device. In some implementations, the device divides the data structure into the plurality of data segments. In some implementations, the device obtains a respective location and a respective reachability of each user device of the plurality of user devices to determine a set of user devices connected to a base station. In some implementations, the device determines a communication capability of the base station to determine a subset of user devices of the set of user devices and one or more sets of data segments of the plurality of data segments. In some implementations, the device sends the one or more sets of data segments to the subset of user devices via the base station based on the respective reachability of each user device of the subset of user devices. In some implementations, a user device of the subset of user devices sends, to the device, an acknowledgment message after receiving a data segment and/or a final acknowledgment message after receiving all the plurality of data segments.

In this way, some implementations provide a device that may target a portion of the set of user devices that are associated with a base station (e.g., the subset of user devices that are reachable) to receive the one or more sets of data segments that collectively comprise the data structure. This may increase a likelihood of delivering the data structure to the portion of user devices than would occur by attempting to deliver the data structure to the entire set of user devices associated with the base station. This also reduces the load on the base station, or other network devices, associated with the set of user devices. Further, some implementations provide a device that may send information to a user device a block or segment at a time, thereby ensuring that the user device can receive the information segment-by-segment while the user device is reachable. This may increase reliability for the user device to receive critical updates, such as security patches, software upgrades, critical configuration files, and/or the like, which may ensure proper functioning of the user device and reduce a likelihood of the user device malfunctioning and/or being subjected to a hacking attempt, malware infection, and/or the like.

Moreover, some implementations provide for a user device to send acknowledgment messages to the device regarding the user device obtaining one or more data segments, which may prevent the device from resending successfully received data segments. This conserves resources (e.g., processor resources, memory resources, network resources, power resources) of the device, the user device, the base station, one or more other devices, and/or the like that would otherwise be wasted by repeatedly resending the data segments to the user device.

FIGS. 1A-1E are diagrams of one or more example implementations 100 described herein. Example implementation 100 illustrate various portions of one or more wireless telecommunications systems, such as a long term evolution (LTE) wireless telecommunications system, a 3G wireless telecommunications system, a 4G wireless telecommunications system, an LTE-Advanced (LTE-A) wireless telecommunications system, a 5G wireless telecommunications system, and/or the like.

As shown in FIG. 1A, example implementation 100 may include one or more user devices (shown as user devices 102-1 through 102-L) connected to one or more radio access networks (RANs) at one or more base stations (shown as gNB/eNBs 104-1 through 104-M), such as a gNB base station associated with a 5G telecommunications system, an eNB base station associated with an LTE telecommunications system, and/or the like. For example, a first set of user devices (e.g., one or more user devices 102-1) may be wirelessly connected with gNB/eNB 104-1 and a second set of user devices (e.g., one or more user devices 102-L) may be wirelessly connected with gNB/eNB 104-M. In some implementations, a base station may have a communication capability that includes one or more properties such as a bandwidth, a capacity (e.g., a maximum number of data connections supported by the base station), a coverage area, a frequency range, and/or the like.

As further shown in FIG. 1A, a base station of the one or more base stations may be connected to a network device (shown as AMF/MMES 106-1 through 106-N), such as an access and mobility management function (AMF) associated with a 5G telecommunications system, a mobility management entity (MME) associated with an LTE telecommunications system, and/or the like. For example, gNB/eNB 104-1 may be connected with AMF/MME 106-1 and gNB/eNB 104-M may be connected with AMF/MME 106-N. In some implementations, the network device may communicate with a set of user devices associated with a base station, of the one or more user devices, via the base station. In some implementations, the network device may communicate with the set of user devices to determine, for each user device of the set of user devices, information concerning a location of the user device and/or information concerning a reachability of the user device. In some implementations, the information concerning the location of the user device may include a physical location of the user device (e.g., a latitude and longitude of the user device); a geographic area associated with the user device (e.g., a country associated with user device; a state associated with the user device; a region associated the user device, such as the Pacific Northwest, the East Coast, the Great Lakes region, and/or the like; an identifier of a base station (e.g. a base station identification string) associated the user device; an identifier of a network device (e.g., a network device identification string) associated with the base station and/or the user device; and/or the like. In some implementations, the information concerning the reachability of the user device may include a reachability status of the user device (e.g., whether the user device is active, awake, asleep, idle, connected, and/or the like); a reachability time of the user device (e.g., a time when the user device is reachable, how long the user device is reachable, a schedule of when the user device is reachable and/or for how long, and/or the like); and/or the like. In some implementations, the network device may store the information concerning the location of the user device and/or the information concerning the reachability of the user device.

As further shown in FIG. 1A, the network device may be connected to a network exposure device, such as an exposure function device (shown as NEF/SCEF 108) that may include one or more components for communicating with different telecommunications systems, such as a network exposure function (NEF) for a 5G telecommunications system, a service capability exposure function (SCEF) for an LTE telecommunications system, and/or the like. In some implementations, one or more network devices, such as one or more network devices that support different telecommunications systems, may be connected to the same network exposure device. For example, AMF/MME 106-1 may be connected with NEF/SCEF 108 and AMF/MME 106-N may be connected with NEF/SCEF 108. In some implementations, the network exposure device may be connected to a server device (shown as server 110), such as an application server, to facilitate communication between the one or more user devices and the server device. For example, the NEF/SCEF 108 may be connected with server 110.

Figure 1B:
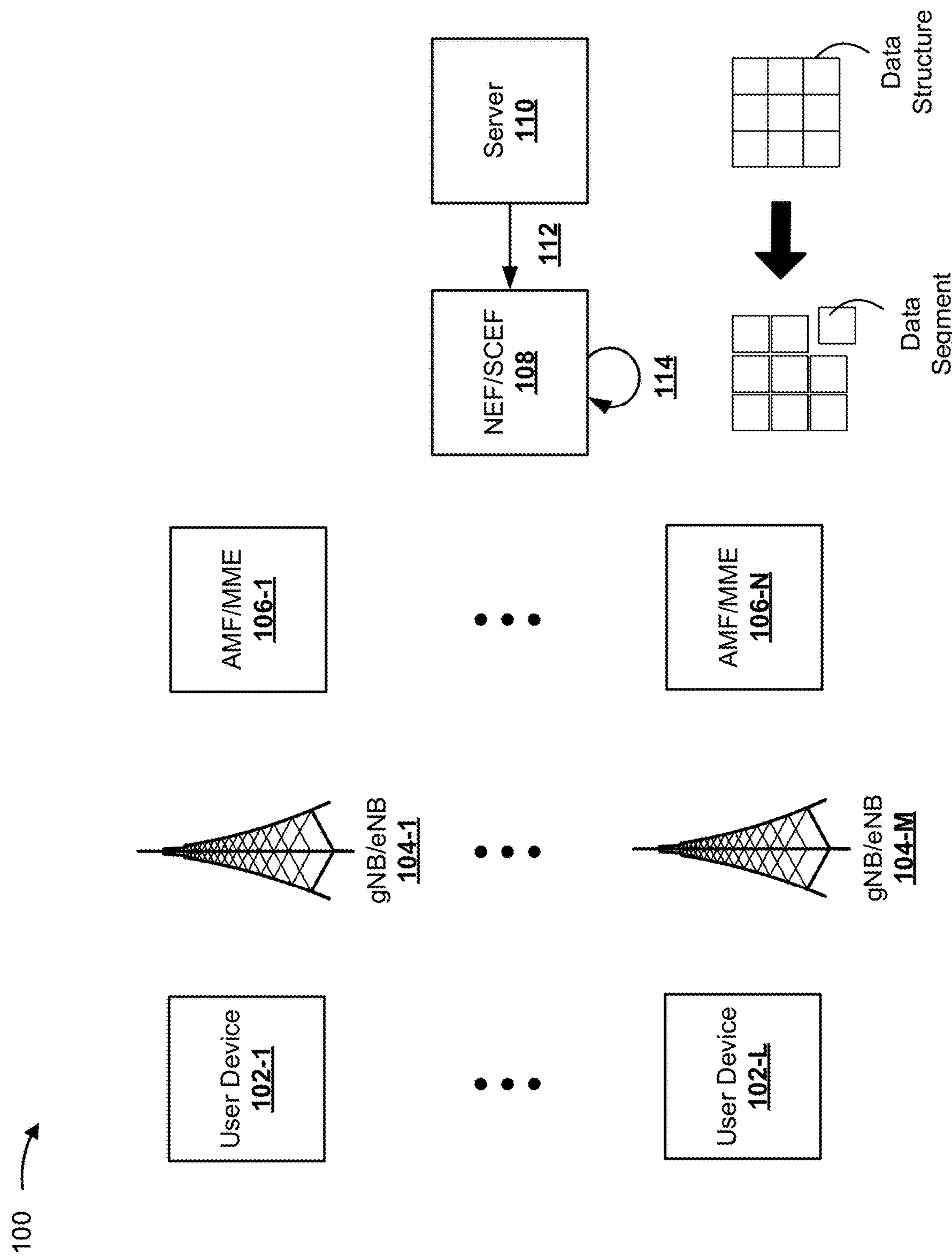

As shown in FIG. 1B and by reference number 112, the server device may send a data structure, such as a software upgrade file image, a security patch, a configuration file, an update file, one or more messages, and/or the like to the network exposure device. In some implementations, the data structure may be associated with and/or comprise instructions, such as executable code (e.g., software code, machine language code, and/or the like). In some implementations, a user device may be configured to execute the instructions upon receiving the data structure. In some implementations, the server device may send, to the network exposure device, information identifying one or more user devices that are to receive the data structure. In some implementations, the information may include a list of the one or more user devices, a respective identifier associated with each user device of the one or more user devices, a respective capability of each user device of the one or more user devices, a respective type of each user device of the one or more user devices, and/or the like. For example, the server device may send the data structure and information that includes a list of the one or more user devices to the network exposure device. In some implementations, the network exposure device may identify the one or more user devices that are to receive the data structure based on the information identifying the one or more user devices. For example, the network exposure device may parse the information identifying the one or more user devices to determine the respective identifier associated with each user device of the one or more user devices.

As shown by reference number 114, the network exposure device may divide the data structure into a plurality of data segments. In some implementations, the network exposure device may divide the data structure into a plurality of data segments of a particular size. For example, the network exposure device may determine a respective reachability of each user device of the one or more user devices (e.g., as described herein in relation to FIG. 1C) and determine one or optimal data segment sizes based on a respective reachability of a user device (e.g., one or more data segment sizes that can be transmitted to the user device during a period of time that the user device is reachable). As another example, the network exposure device may determine a communication capability of a base station (e.g., as described herein in relation to FIG. 1D) and determine one or more optimal data segment sizes based on the communication capability (e.g., one or more data segment sizes that correspond to one or more message sizes used by the base station for communicating with a user device). In some implementations, the network exposure device may divide the data structure into the plurality of data segments according to the one or more optimal data segment sizes.

Figure 1C:
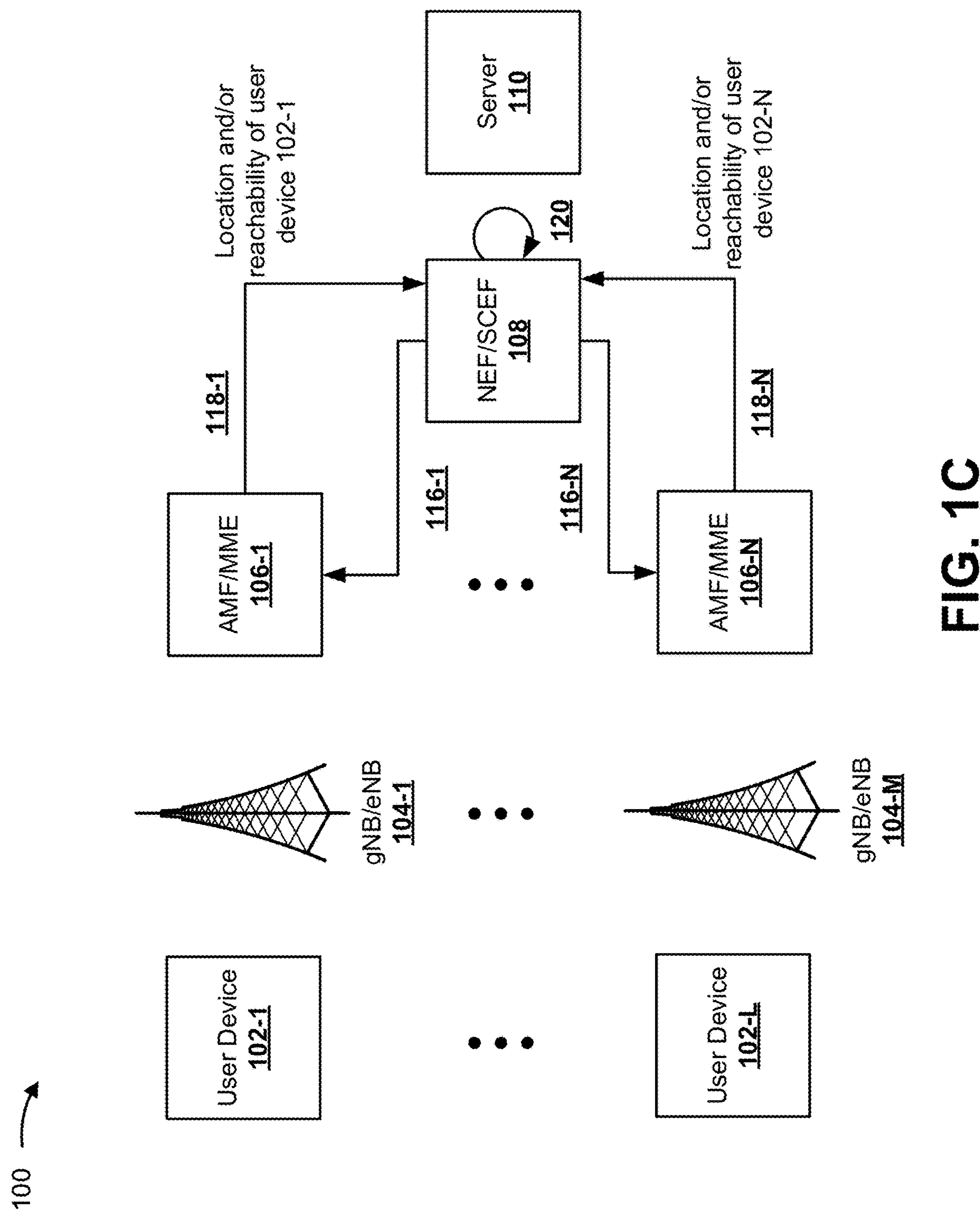

As shown in FIG. 1C, the network exposure device may determine a location and/or a reachability of each user device of the one or more user devices. As shown by reference numbers 116-1 to 116-N, the network exposure device may send a query regarding the one or more user devices to each network device of the one or more network devices. In some implementations, the query may include a request for information concerning a respective location and/or a respective reachability of each user device of the one or more user devices. As shown by reference numbers 118-1 to 118-N, each network device of the one or more network devices may send information concerning the respective location and/or the respective reachability of each user device associated with the network device to the network exposure device. In some implementations, the information may include, for a user device associated with a network device, a user device identifier (e.g., a device identification string); an identifier of a base station associated the user device; an identifier of the network device associated with the base station and/or the user device; information identifying a physical location of the user device; information identifying a geographic area associated with the user device; a reachability status of the user device; a reachability time of the user device; and/or the like.

As shown by reference number 120, the network exposure device may determine, based on the respective location of each user device of the one or more user devices, a set of user devices, of the one or more user devices, connected to a base station. For example, the network exposure device may determine a set of user devices 102-1 that are connected to gNB/eNB 104-1, a set of user devices 102-L that are connected to gNB/eNB 104-M, and/or the like. In some implementations, the network exposure device may determine, based on the respective location of each user device of the one or more user devices, a network device, of the one or more network devices, that is associated with the base station and the set of user devices. For example, as shown in FIG. 1C, the network exposure device may determine that AMF/MME 106-1 is associated with gNB/eNB 104-1 and the set of user devices 102-1, that AMF/MME 106-N is associated with gNB/eNB 104-M and the set of user devices 102-L, and/or the like. In this way, the network exposure device may determine which user devices are associated with a base station and/or network device.

Figure 1D:
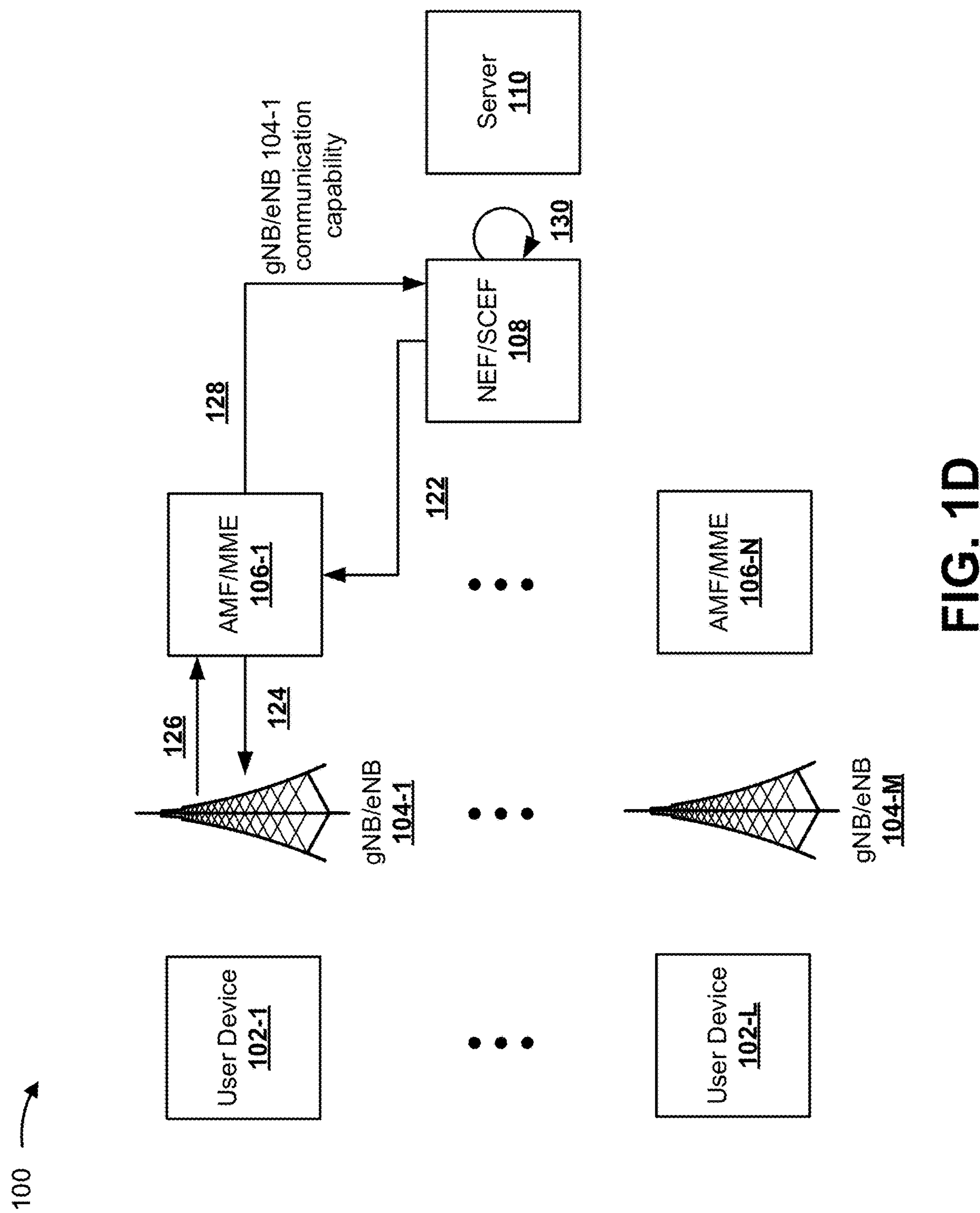

As shown in FIG. 1D, the network exposure device may determine a communication capability of a base station associated with a set of user devices and/or a network device associated with the set of user devices. As shown by reference number 122, the network exposure device may send a query regarding the base station to the network device associated with the base station. In some implementations, the query includes a request regarding the communication capability of the base station. As shown by reference number 124, the network device may send the query to the base station. As shown by reference number 126, the base station may send information concerning the communication capability of the base station to the network device. As shown by reference number 128, the network device may send the information concerning the communication capability of the base station to the network exposure device. As shown by reference number 130, the network exposure device may process the information concerning the communication capability to determine the communication capability of the base station. While it is possible that the network exposure device communicates with a single base station via a single network device to determine a communication capability of the single base station, in practice, the network exposure device may communicate with multiple base stations via multiple network devices to determine the communication capabilities of the multiple base stations.

In some implementations, the network exposure device may determine, based on the communication capability of the base station, a subset of user devices of the set of user devices. For example, the network exposure device may determine, based on the capacity of the base station (e.g., the number of user devices that can be supported by the base station at one time), an optimal number of user devices for the base station to communicate with and determine the subset of user devices to comprise the optimal number of user devices. Additionally, or alternatively, in some implementations, the network exposure device may determine, based on the respective reachability of each user device of the user devices, the subset of user devices of the set of user devices. For example, the network exposure device may determine, based on the respective reachability of each user device of the set of user devices, a subset of user devices that are reachable during a period of time (e.g., those user devices that are reachable during a 1 hour window, a 4 hour window, a 24 hour window, and/or the like).

In some implementations, the network exposure device may determine, based on the communication capability, one or more sets of data segments of the plurality of data segments. For example, the network exposure device may determine, based on the bandwidth of the base station, an optimal number of data segments to transmit to a user device and limit the number of data segments in a set of data segments, of the one or more sets of data segments, to the optimal number of data segments.

Figure 1E:
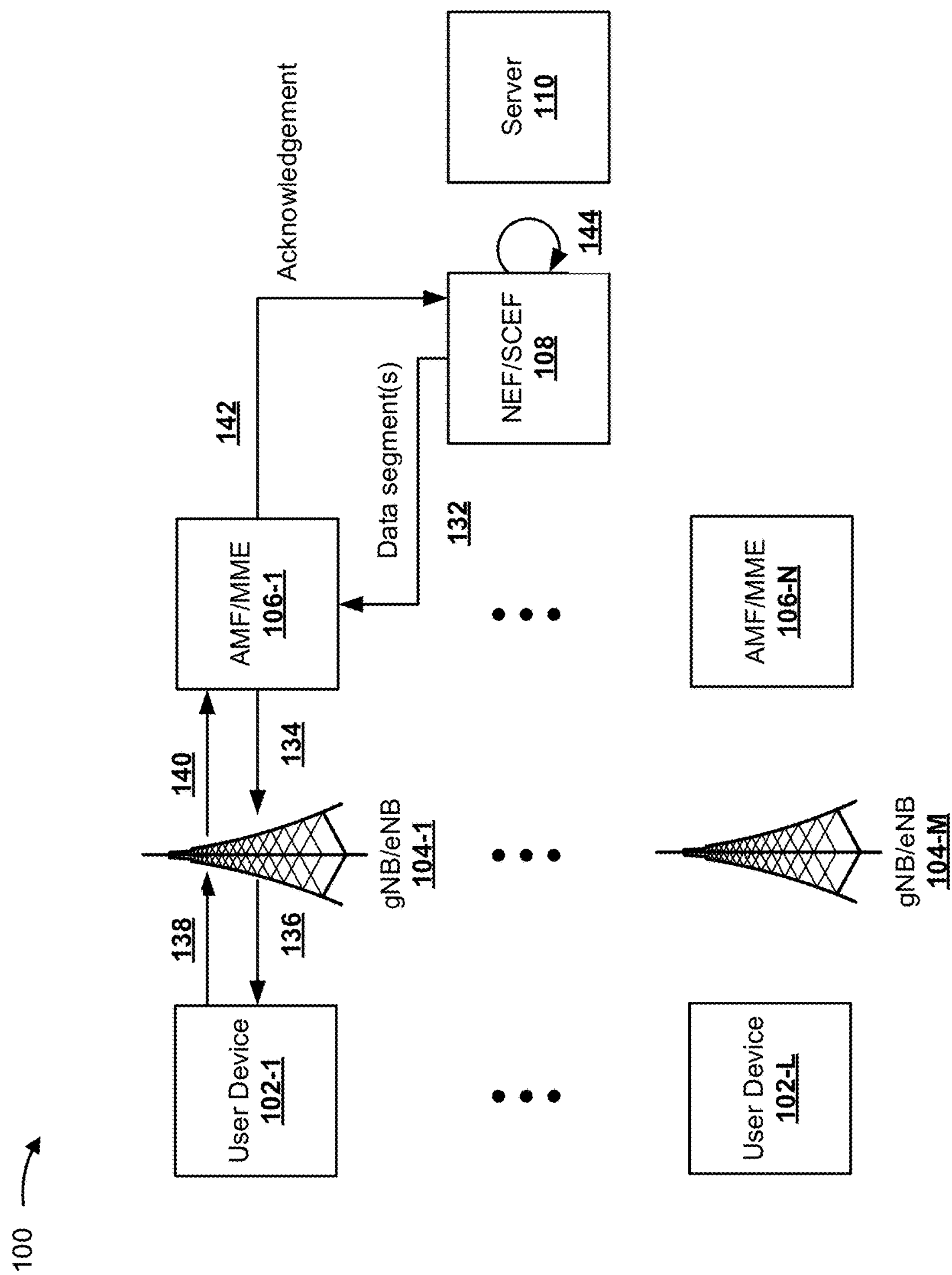

As shown in FIG. 1E, the network exposure device may send the plurality of data segments to the subset of user devices and receive one or more acknowledgment messages from the subset of user devices. In some implementations, the network exposure device may send the plurality of data segments to the subset of user devices one data segment at time, two or more data segments at a time, one set of data segments at a time, two or more sets of data segments at a time, and/or the like.

In some implementations, the network exposure device may generate a message (e.g., a delivery message), where the message includes a data segment. In some implementations, a message may include a message header, the data segment, a data segment identifier, a total number of the plurality of data segments, a checksum concerning the data segment, and/or the like. In some implementations, the network exposure device may generate one or more messages, where each message includes a respective data segment of a set of data segments. In some implementations, the network exposure device may send the one or more messages (e.g., consecutively, one message at a time), to at least one user device of the subset of user devices. In some implementations, the network exposure device may send, based on the respective reachability of each user device of the subset of user devices, the one or more messages to the subset of user devices. For example, the network exposure device may determine, for a user device of the subset of user devices, a time of reachability of the user device and send, based on the time of reachability of the user device, the one or more messages to the user device.

As shown by reference number 132, the network exposure device may send the one or more messages to the network device. As shown by reference number 134, the network device may receive the one or more messages and may send the one or more messages to the base station. As shown by reference number 136, the base station may receive the one or more messages and may send the one or more messages to at least one user device of the subset of user devices. In some implementations, the at least one user device may receive the one or more messages. In some implementations, the at least one user device may parse the one or more messages and store the respective data segments of the one or more messages.

In some implementations, the at least one user device may generate one or more acknowledgment messages, where each acknowledgment message may correspond to a respective message of the one or more messages. In some implementations, an acknowledgment message may indicate whether the at least one user device has successfully obtained a respective data segment included in a message of the one or more messages. For example, the acknowledgment message may indicate that the at least one user device received a data segment included in a message and that the at least one user device verified the integrity of the data segment using the checksum included in the message. As another example, the acknowledgement message may indicate that the at least one device received a message, but that the at least one user device determined that the message did not include a data segment, the at least one user device was unable to save the data segment, and/or the data segment was incomplete, corrupted, and/or the like. In some implementations, the acknowledgement message may include a message header, a data segment identifier, a status indicator concerning a data segment (e.g., whether the user device has successfully obtained the data segment included in a message), a status explanation concerning the data segment (e.g., additional information concerning why the user device successfully obtained or unsuccessfully obtained the data segment); and/or the like.

As shown by reference number 138, the at least one user device may send the one or more acknowledgment messages to the base station. As shown by reference number 140, the base station may receive the one or more acknowledgment messages and may send the one or more acknowledgment messages to the network device. As shown by reference number 142, the network device may receive the one or more acknowledgment messages and may send the one or more acknowledgment messages to the network exposure device.

As shown by reference number 144, the network exposure device may receive and process the one or more acknowledgment messages. In some implementations, the network exposure device may determine, based on the one or more acknowledgment messages, that the at least one user device has obtained the respective data segments included in the one or more messages. Accordingly, in some implementations, the network exposure device may generate one or more additional messages, where each additional message includes a respective data segment of an additional set of data segments, and send the one or more additional messages to the at least one user device in a similar manner as described herein in relation to FIG. 1E and reference numbers 132-136. In some implementations, the at least one user device may generate one or more additional acknowledgment messages, where each additional acknowledgment message corresponds to a respective additional message of the one or more additional messages, and send the one or more additional acknowledgment messages to the network exposure device in a similar manner as described herein in relation to FIG. 1E and reference numbers 138-142. In some implementations, the network exposure device may process the one or more additional acknowledgment messages to determine that the at least one user device has obtained the respective data segments included in the one or more additional messages. In this way, the network exposure device can transmit the plurality of data segments to the at least one user device, one set of data segments at a time, until the at least one user device has received all the data segments that collectively comprise the data structure.

In some implementations, the network exposure device may determine, based on the one or more acknowledgment messages, that the at least one user device has not obtained the respective data segments included in the one or more messages. Accordingly, in some implementations, the network exposure device may resend at least one message of the one or more messages to the at least one user device in a similar manner as described herein in relation to FIG. 1E and reference numbers 132-136. Additionally, or alternatively, in some implementations, the network exposure device may communicate with the base station to cause the base station, which may save the one or more messages for a period of time, to resend the at least one message of the one or more messages to the at least one user device. In some implementations, the at least one user device may generate at least one new acknowledgment message, where the at least one new acknowledgment message corresponds to the at least one message of the one or more messages, and send the at least one new acknowledgment message to the network exposure device in a similar manner as described herein in relation to FIG. 1E and reference numbers 138-142. In some implementations, the network exposure device may receive and process the at least one new acknowledgment message in a similar manner as described herein in relation to FIG. 1E and reference number 144. In this way, the network exposure device ensures that all data segments that are part of a set of data segments are transmitted to the at least one user device without having to resend messages that include data segments already successfully obtained by the at least one user device. This can conserve resources (e.g., processor resources, memory resources, network resources, power resources) of the network exposure device, the network device, the base station, and/or the user device that would otherwise be wasted by repeatedly resending each message of the one or more messages to the at least one user device.

In some implementations, after receiving all the data segments of the plurality of data segments, the at least one user device may send a final acknowledgment message to the network exposure device. In some implementations, the final acknowledgment message may indicate that the at least one user device successfully obtained all data segments that collectively comprise the data structure. In some implementations, at least one user device may send the final acknowledgment message to the base station, which may receive and send the final acknowledgment message to the network device. In some implementations, the network device may receive the final acknowledgment message and send the final acknowledgment message to the network exposure device. In some implementations, the network exposure device may receive and send the final acknowledgment message to the server device. In some implementations, the network exposure device may send information concerning a data structure receipt status of the at least one user device to the server device, a data structure receipt status of the subset of user devices, a data structure receipt status of the set of user devices, and/or the like to the server device.

In some implementations, after receiving all the data segments of the plurality of data segments, the at least one user device may reassemble the data structure. Accordingly, in some implementations, the at least one user device may execute the instructions associated with the data structure. In some implementations, the at least one user device may send an update acknowledgment message to the network exposure device. In some implementations, the update acknowledgement message may indicate whether the user device successfully processed the data structure (e.g. executed the instructions) to update the user device. In some implementations, at least one user device may send the update acknowledgment message to the base station, which may receive and send the update acknowledgment message to the network device. In some implementations, the network device may receive the update acknowledgment message and send the update acknowledgment message to the network exposure device. In some implementations, the network exposure device may receive and send the update acknowledgment message to the server device. In some implementations, the network exposure device may send information concerning an update status of the at least one user device to the server device, an update status of the subset of user devices, an update status of the set of user devices, and/or the like to the server device. In this way, the network exposure facilitates updating one or more user device and notifying the server device that the one or more user devices have been updated.

As indicated above, FIGS. 1A-1E are provided merely as examples. Other examples can differ from what was described with regard to FIGS. 1A-1E. Further, the number and arrangement of devices and networks shown in FIGS. 1A-1E are provided as an example. In practice, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of example implementation 100 may perform one or more functions described as being performed by another set of devices of example implementation 100.

Figure 2B:
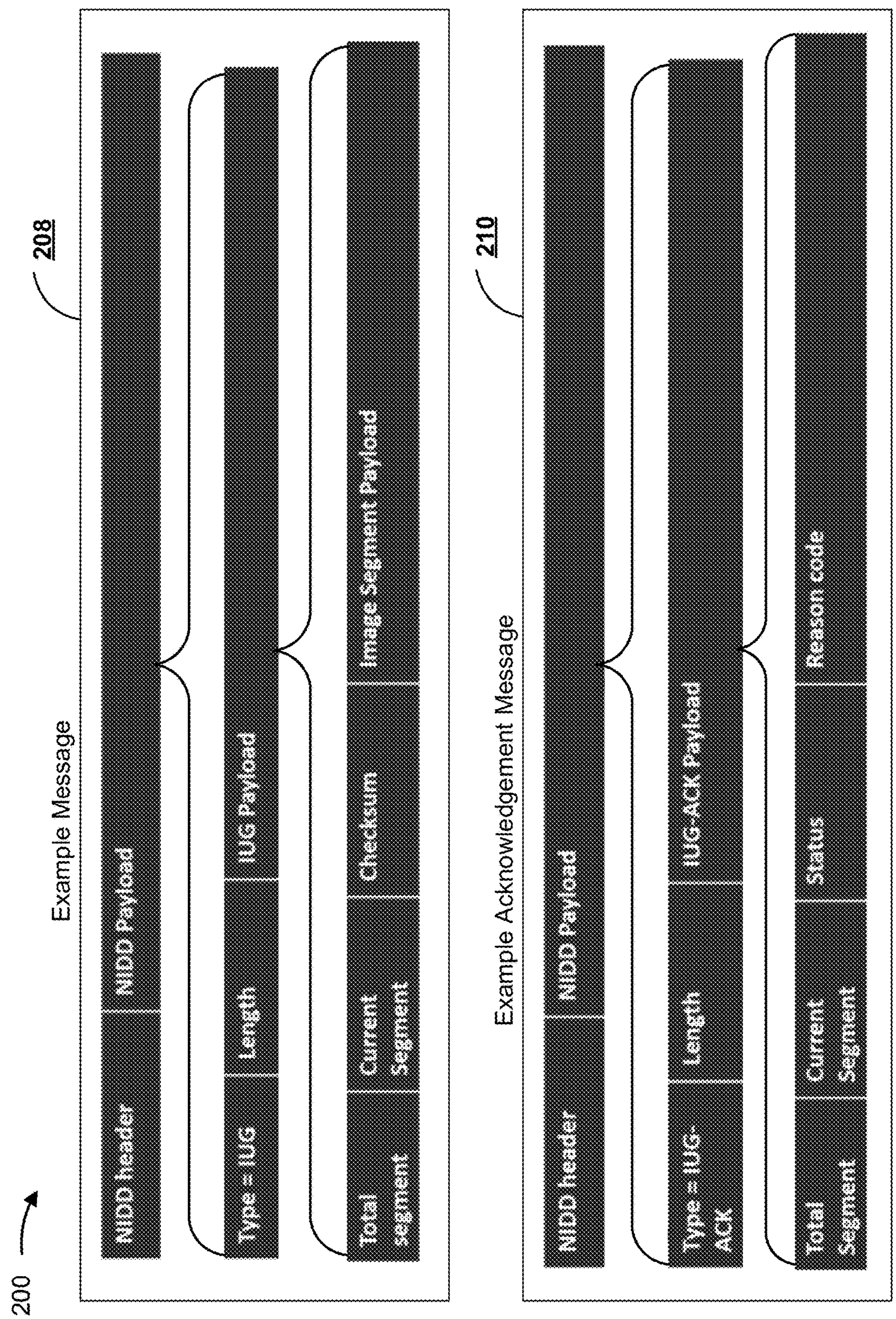

FIGS. 2A-2B are diagrams that show example information that may be stored by the network exposure device, an example message that can be transmitted from the network exposure device to a user device, and an example acknowledgment message that can be transmitted from the user device to the network exposure device. As shown in FIG. 2A, the network exposure device may store information about the one or more user devices, the one or more base stations, the one or more network devices, the plurality of data segments, and/or the like to facilitate the actions taken by the network exposure device described in FIGS. 1A-1E. As shown by reference number 202, the network exposure device may maintain information concerning a status of delivering a data structure to a subset of user devices (e.g., reachable user devices associated with a base station). For example, the network exposure device may maintain a table that includes a "job" identifier (e.g., a job to deliver a data structure to a subset of user devices), a "# of segments identifier" (e.g., a number of data segments that collectively comprise a data structure), a "% of UE" identifier (e.g., a percentage of user devices, of a set of user devices associated with a base station, that comprise the subset of user devices), a "progress" identifier (e.g., an indication of how many data segments have been delivered to the subset of user devices), and/or the like.

As shown by reference number 204, the network exposure device may maintain information concerning a base station. For example, the network exposure device may maintain a table that includes a "Cell-ID" identifier (e.g., an identifier of a base station), a "# of devices" identifier (e.g., a number of user devices in a set of user devices connected to the base station), a "Serving AMF/MME" identifier (e.g., an identifier of a network device associated with the base station), a "Device IDs" identifier (e.g., an identifier of each user device of the set of user devices associated with the base station), and/or the like.

As shown by reference number 206, the network exposure device may maintain information concerning a reachability of a set of user devices associated with a base station. For example, the network exposure device may maintain a table that includes a "Cell-ID" identifier (e.g., an identifier of a base station), a "Reachable" identifier (e.g., a number of user devices in a set of user devices connected to the base station that are reachable (e.g., a number of user devices in a subset of user devices)), an "Availability Time" identifier (e.g., a time or times when the reachable user devices are reachable), a "Serving AMF/MME" identifier (e.g., an identifier of a network device associated with the base station), an "Image Segment list refs" identifier (e.g., an identifier for each data segment of a plurality of data segments that comprise a data structure), a "Current seg status" identifier (e.g., a status of whether the subset of user devices have received all the data segments of the plurality of data segments), a "Final status" identifier (e.g., a status of whether the network exposure device is still attempting to send the plurality of data segments to the subset of user devices), and/or the like.

As shown in FIG. 2B, the network exposure device may send an example message and a user device (e.g., a user device of a subset of user devices) may send an example acknowledgement message. As shown by reference number 208, the example message may include non-IP data delivery (NIDD) information, such as a "NIDD header," which may include information identifying the network exposure device, and a "NIDD Payload" field. In some implementations, the "NIDD Payload" field may include a "Type=IUG" field, which indicates that the message is associated with an upgrade image file, a "Length field," which indicates a length of the message in bits and/or bytes, and an "IUG Payload" field. In some implementations, the "IUG Payload" field may include a "Total Segment" field, which indicates a total number of a plurality of data segments that comprise a data structure, a "Current Segment" field, which identifies a data segment, a "Checksum" field, which includes a checksum value to validate the data segment, and an "Image Segment Payload" field, which includes the data segment.

As shown by reference number 210, the example acknowledgment message may include NIDD information, such as a "NIDD header," which may include information identifying the user device, and a "NIDD Payload" field. In some implementations, the "NIDD Payload" field may include a "Type=IUG-ACK" field, which indicates that the acknowledgement message is an acknowledgment message associated with an upgrade image file, a "Length field," which indicates a length of the acknowledgement message in bits and/or bytes, and an "IUG-ACK Payload" field. In some implementations, the "IUG-ACK Payload" field may include a "Total Segment" field, which indicates a total number of a plurality of data segments that comprise a data structure, a "Current Segment" field, which identifies a data segment, a "Status" field, which indicates whether the user device successfully obtained the data segment included in a message, and a "Reason code" field, which includes additional information concerning why the user device successfully obtained or unsuccessfully obtained the data segment.

As indicated above, FIGS. 2A-2B are provided merely as examples. Other examples can differ from what was described with regard to FIGS. 2A-2B.

Figure 3:
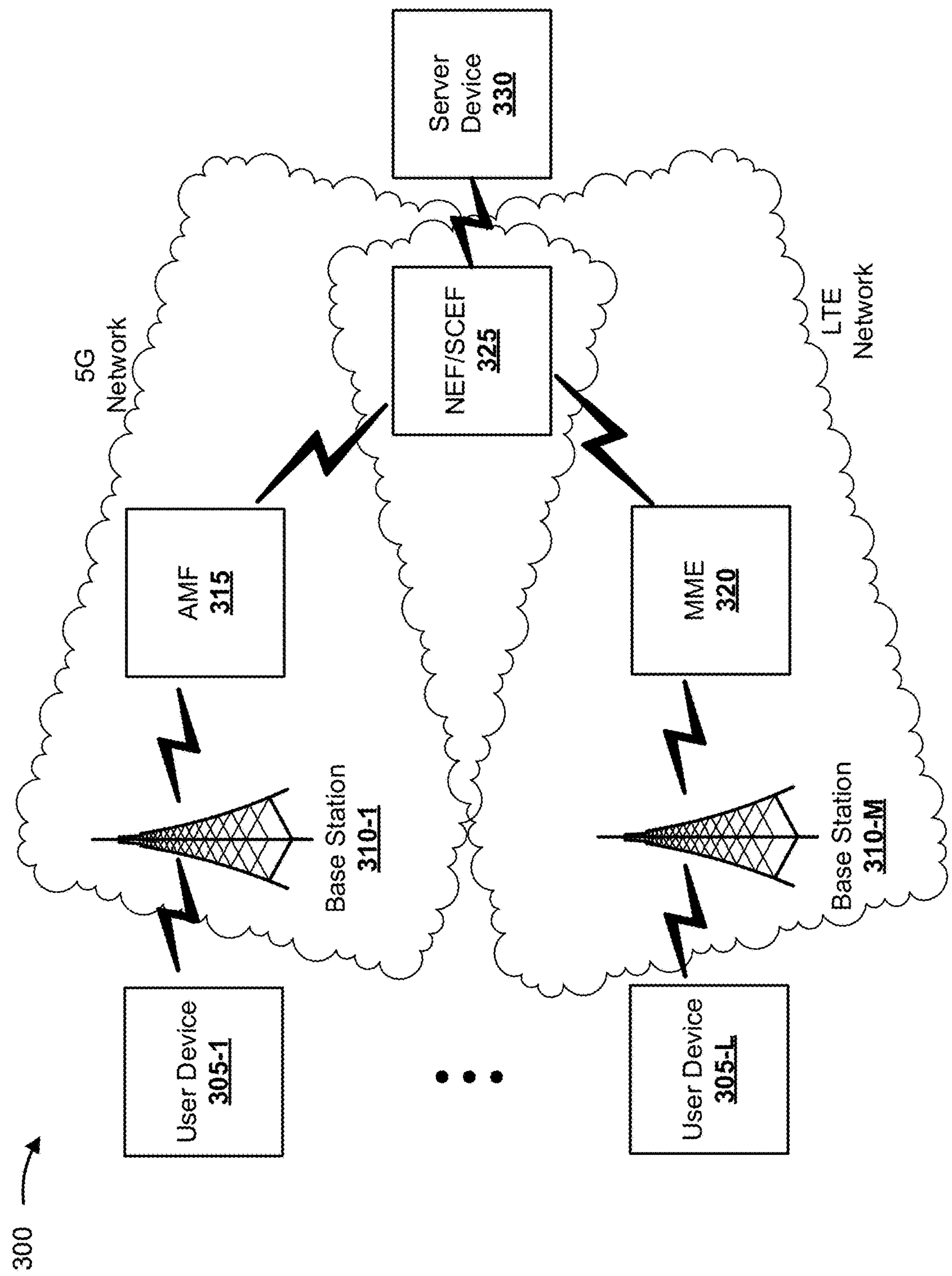
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include one or more user devices 305-1 through 305-L (L≥1) (hereinafter referred to collectively as "user devices 305," and individually as "user device 305"), one or more base stations 310-1 through 310-M (M≥1) (hereinafter referred to collectively as "base stations 310," and individually as "base station 310"), an access and mobility management function (AMF) 315, a mobility management entity (MME) 320, a network exposure function (NEF)/service capability exposure function (SCEF) (herein after referred to as a "NEF/SCEF") 325, and a server device 330. Devices of environment 300 may interconnect via wired connections, wireless connections, or a combination of wired and wireless connections.

User device 305 includes one or more devices capable of receiving, generating, storing, processing, and/or providing information, such as information described herein. For example, user device 305 may include a communication and/or computing device, such as an Internet of Things (IoT) device (e.g., a category M1 (Cat-M1) device, a narrow band (NB) IoT device, and/or the like) a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 305 may receive information, such as a message that includes a data segment, from and/or transmit information, such as an acknowledgment message, to AMF 315 via base station 310-1 and/or MME 320 via base station 310-M.

Base station 310 includes one or more devices capable of transferring traffic, such as audio, video, text, one or more messages, and/or other traffic, to or from user device 305, AMF 315, and/or MME 320. In some implementations, base station 310 can include a small cell base station, such as a base station of a microcell, a picocell, and/or a femtocell. In some implementations, base station 310 can send traffic to and/or receive traffic from user device 305 via an air interface. In some implementations, base station 310 (e.g., base station 310-1) may include a gNB associated with a 5G network that receives traffic from and/or sends traffic to the NEF/SCEF 325 via AMF 315. In some implementations, base station 310 (e.g., base station 310-M) may include an eNB associated with an LTE network that receives traffic from and/or sends traffic to the NEF/SCEF 325 via MME 320. Additionally, or alternatively, one or more base stations 310 can be associated with a radio access network (RAN) that is not associated with the 5G network or the LTE network, such as a 3G network, a 4G network, an LTE-Advanced (LTE-A) network, and/or the like.

AMF 315 includes one or more network devices, such as one or more server devices, capable of managing authentication, activation, deactivation, and/or mobility functions associated with a user device 305 connected to the 5G network (e.g., user device 305-1). In some implementations, AMF 315 may perform operations relating to authentication of user device 305. AMF 315 may perform operations associated with handing off user device 305 from a first base station 310 to a second base station 310 when user device 305 is transitioning from a first cell associated with the first base station 310 to a second cell associated with the second base station 310. Additionally, or alternatively, AMF 315 may select another AMF (not pictured), to which user device 305 should be handed off (e.g., when user device 305 moves out of range of AMF 315). In some implementations, AMF 315 may communicate with a user device 305 (e.g., via base station 310) to obtain information concerning a location of the user device 305 and/or a reachability of user device 305 and may send the information to NEF/SCEF 325.

MME 320 includes one or more network devices, such as one or more server devices, capable of managing authentication, activation, deactivation, and/or mobility functions associated with a user device 305 connected to the LTE network (e.g., user device 305-L). In some implementations, MME 320 may perform operations relating to authentication of user device 305. MME 320 may perform operations associated with handing off user device 305 from a first base station 310 to a second base station 310 when user device 305 is transitioning from a first cell associated with the first base station 310 to a second cell associated with the second base station 310. Additionally, or alternatively, MME 320 may select another MME (not pictured), to which user device 305 should be handed off (e.g., when user device 305 moves out of range of MME 320). In some implementations, MME 320 may communicate with a user device 305 (e.g., via base station 310) to obtain information concerning a location of the user device 305 and/or a reachability of user device 305 and may send the information to NEF/SCEF 325.

NEF/SCEF 325 includes one or more network exposure devices, such as one or more server devices, capable of exposing capabilities, events, information, and/or the like in one or more wireless networks to help other devices in the one or more wireless networks discover network services and/or utilize network resources efficiently. In some implementations, the NEF/SCEF 325 may include a NEF associated with a 5G network that receives traffic from and/or sends traffic to a user device 305 via AMF 315 and base station 310, and that receives traffic from and/or sends traffic to server device 330. In some implementations, the NEF/SCEF 325 may include a SCEF associated with an LTE network that receives traffic from and/or sends traffic to a user device 305 via MME 320 and base station 310, and that receives traffic from and/or sends traffic to server device 330. In some implementations, the NEF/SCEF 325 may obtain a data structure from server device 330 and divide the data structure into a plurality of data segments. In some implementations, the NEF/SCEF 325 may determine a location and/or reachability of a user device 305 and/or a communication capability of base station 310 to determine how to send the plurality of data segments to the user device 305.

Server device 330 includes one or more devices capable of receiving, generating, storing, processing, and/or providing information, such as information described herein. For example, server device 330 may include a server device (e.g., a host server, a web server, an application server, etc.), a data center device, or a similar device. In some implementations, the server device 330 may send a data structure to NEF/SCEF 325 and receive one or more messages from NEF/SCEF 325.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
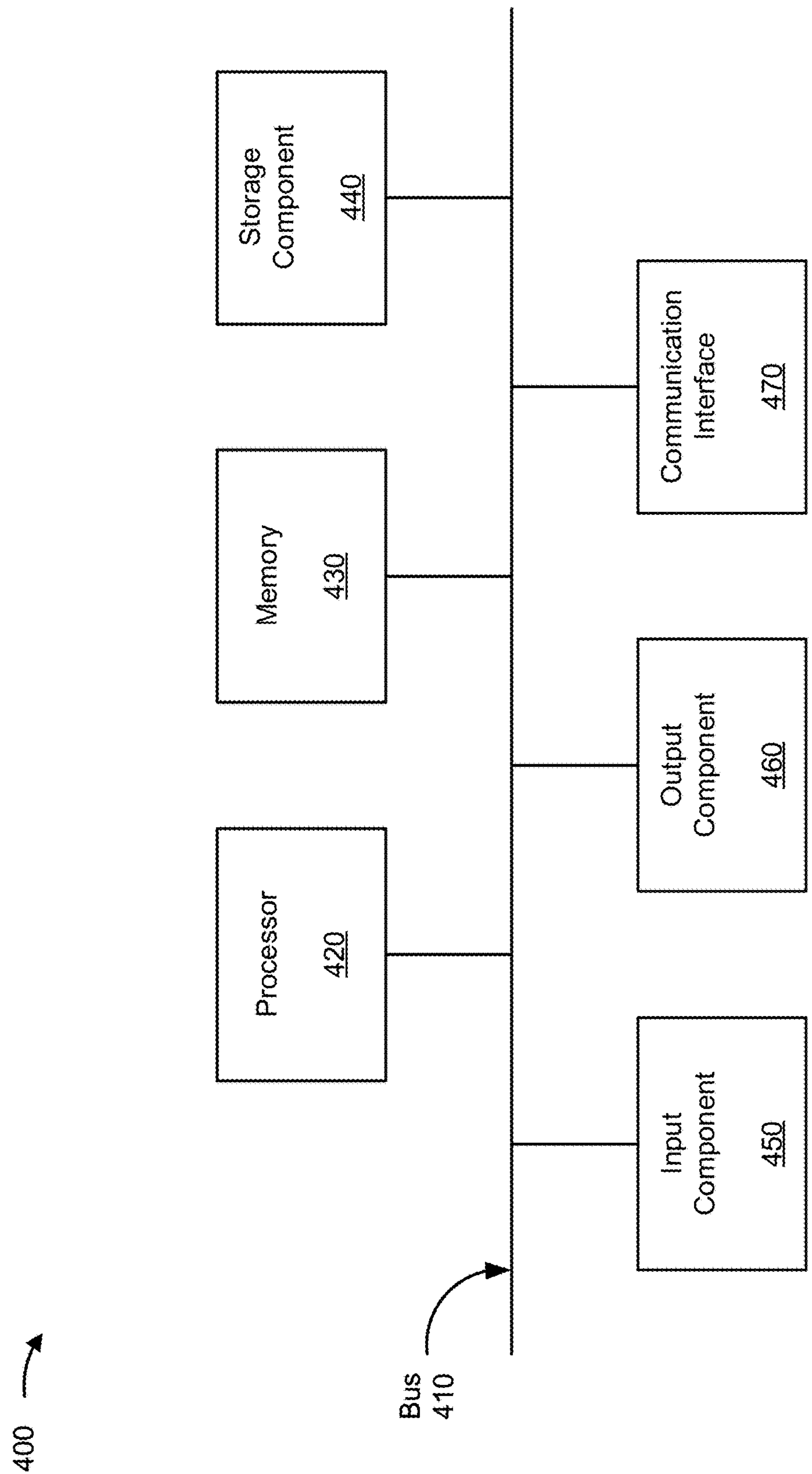
FIG. 4 is a diagram of example components of one or more devices of FIG. 3.

FIG. 4 is a diagram of example components of a device 400. Device 400 may correspond to user device 305, base station 310, AMF 315, MME 320, NEF/SCEF 325, and/or server device 330. In some implementations, user device 305, base station 310, AMF 315, MME 320, NEF/SCEF 325, and/or server device 330 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
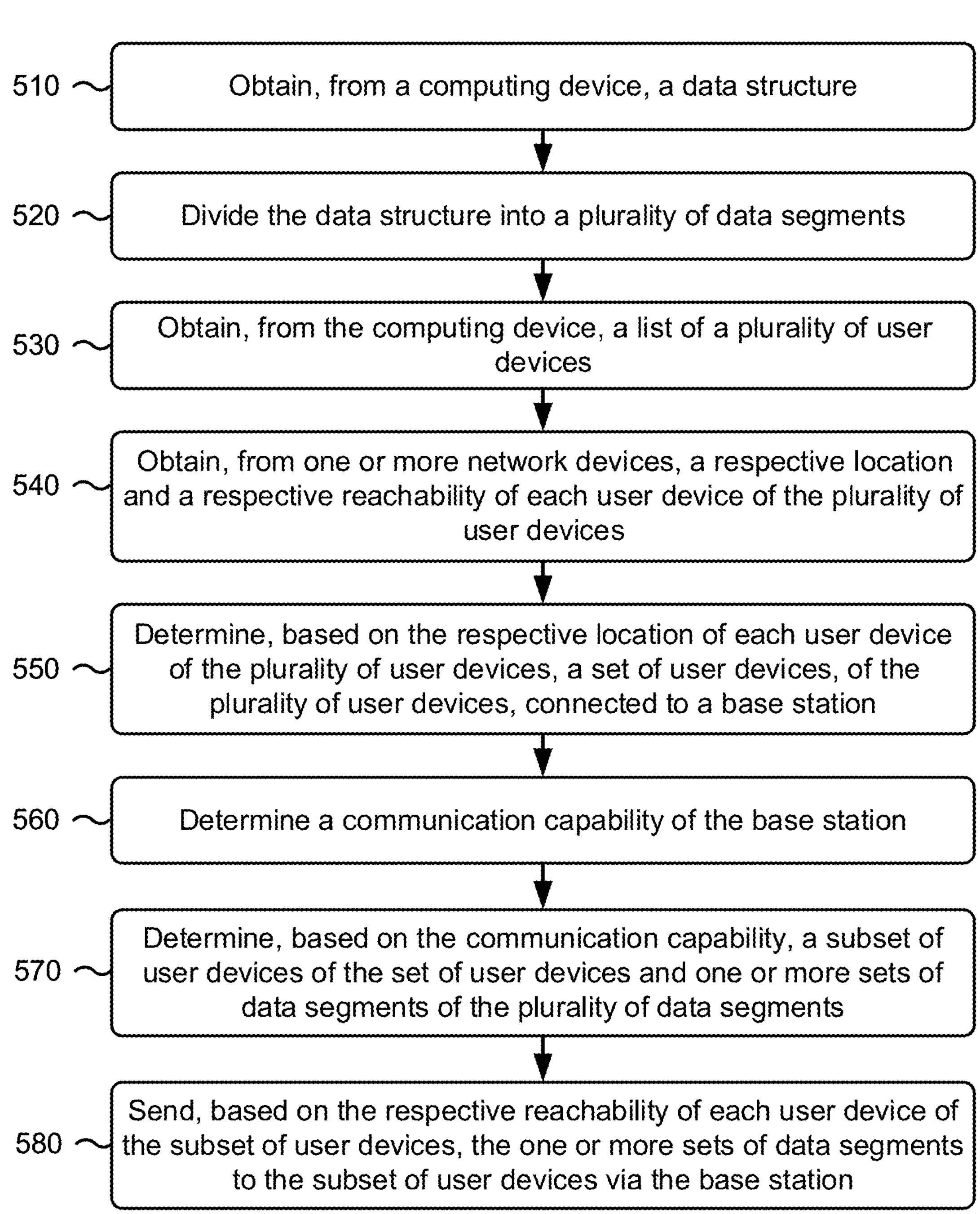
FIG. 5 is a flow chart of an example process for a method and device for updating user devices via a cellular connection.

FIG. 5 is a flow chart of an example process 500 for updating user devices via a cellular connection. In some implementations, one or more process blocks of FIG. 5 may be performed by a device, such as a network exposure device (e.g., NEF/SCEF 325). In some implementations, one or more process blocks of FIG. 5 may be performed by another device or a group of devices separate from or including the network exposure device, such as a user device (e.g., user device 305), a base station (e.g., base station 310), a network device, such as an AMF (e.g., AMF 315) or an MME (e.g., MME 320), and/or a server device (e.g., server device 330).

As shown in FIG. 5, process 500 may include obtaining, from a computing device, a data structure (block 510). For example, the network exposure device (e.g., using processor 420, memory 430, storage component 440, communication interface 470, and/or the like) may obtain, from a computing device, a data structure, as described above.

In some implementations, the data structure may be associated with instructions. For example, the data structure may be associated with or may include executable code, such as software code, machine language code, and/or the like. The data structure may include a software upgrade file image, a security patch, a configuration file, an update file, one or more messages, and/or the like.

As further shown in FIG. 5, process 500 may include dividing the data structure into a plurality of data segments (block 520). For example, the network exposure device (e.g., using processor 420, memory 430, storage component 440, and/or the like) may divide the data structure into a plurality of data segments, as described above.

In some implementations, the network exposure device may divide the data structure into a plurality of data segments of a particular size. For example, the network exposure device may determine an optimal data segment size based on the communication capability of the base station and/or the respective reachability of each user device of the subset of user devices, and may divide, based on the optimal data segment size, the data structure into the plurality of data segments.

As further shown in FIG. 5, process 500 may include obtaining, from the computing device, a list of a plurality of user devices (block 530). For example, the network exposure device (e.g., using processor 420, memory 430, storage component 440, communication interface 470, and/or the like) may obtain, from the computing device, a list of a plurality of user devices, as described above.

In some implementations, the network exposure device may identify a plurality of user devices to receive the plurality of data segments. For example, the network exposure device may receive information concerning the plurality of user devices, and may parse the information to determine an identifier of each user device of the plurality of user devices.

As further shown in FIG. 5, process 500 may include obtaining, from one or more network devices, a respective location and a respective reachability of each user device of the plurality of user devices (block 540). For example, the network exposure device (e.g., using processor 420, memory 430, storage component 440, input component 450, communication interface 470, and/or the like) may obtain, from one or more network devices, a respective location and a respective reachability of each user device of the plurality of user devices, as described above.

In some implementations, the network exposure device may obtain and/or determine the respective location and the respective reachability of each user device of the plurality of user devices. For example, the network exposure device may obtain and/or determine, for a user device of the plurality of user devices, a user device identifier, an identifier of a network device, of the one or more network devices, associated with the user device, an identifier of a base station associated with the network device, a reachability status of the user device, and/or a reachability time of the user device.

As further shown in FIG. 5, process 500 may include determining, based on the respective location of each user device of the plurality of user devices, a set of user devices, of the plurality of user devices, connected to a base station (block 550). For example, the network exposure device (e.g., using processor 420, memory 430, storage component 440, communication interface 470, and/or the like) may determine, based on the respective location of each user device of the plurality of user devices, a set of user devices, of the plurality of user devices, connected to a base station, as described above.

In some implementations, the network exposure device may determine a network device, of the one or more network devices, that is associated with the base station, and may determine a group of user devices that are associated with the network device.

As further shown in FIG. 5, process 500 may include determining a communication capability of the base station (block 560). For example, the network exposure device (e.g., using processor 420, memory 430, storage component 440, communication interface 470, and/or the like) may determine a communication capability of the base station, as described above.

In some implementations, the network exposure device may send a query concerning the communication capability of the base station to a network device, of the one or more network devices, associated with the base station, and may receive information concerning the communication capability of the base station from the network device.

As further shown in FIG. 5, process 500 may include determining, based on the communication capability, a subset of user devices of the set of user devices and/or one or more sets of data segments of the plurality of data segments (block 570). For example, the network exposure device (e.g., using processor 420, memory 430, storage component 440, and/or the like) may determine, based on the communication capability, a subset of user devices of the set of user devices and one or more sets of data segments of the plurality of data segments, as described above.

In some implementations, the network exposure device may determine the subset of user devices based on the respective reachability of each user device of the plurality of user devices. For example, the network exposure device may determine a communication capability of the base station, may determine, based on the communication capability of the base station, an optimal amount of user devices for the base station to communicate with over a period of time, and may determine, based on the optimal amount of user devices, the subset of user devices.

In some implementations, the network exposure device may determine the one or more sets of data segments based on the respective reachability of each user device of the plurality of user devices. In some cases, the network exposure device may determine an optimal number of data segments to transmit to a user device, and may determine, based on the optimal number of data segments, a set of data segments of the plurality of data segments.

As further shown in FIG. 5, process 500 may include sending, based on the respective reachability of each user device of the subset of user devices, the one or more sets of data segments to the subset of user devices via the base station (block 580). For example, the network exposure device (e.g., using processor 420, memory 430, storage component 440, output component 460, communication interface 470, and/or the like) may send, based on the respective reachability of each user device of the subset of user devices, the one or more sets of data segments to the subset of user devices via the base station, as described above.

In some implementations, the network exposure device may determine, for a user device of the subset of user devices, a time of reachability of the user device, and may send, based on the time of reachability of the user device, the one or more sets of data segments to the user device. In some cases, the network exposure device may send a message to a user device of the subset of user devices. For example, the message may correspond to a data segment of the plurality of data segments, and may include a message header, the data segment, a data segment identifier, a total number of the plurality of data segments, and/or a checksum concerning the data segment. In some cases, the network exposure device may send the plurality of sets of data segments to the subset of user devices, which may cause a user device of the subset of user devices to execute the instructions associated with the data structure.

In some implementations, the network exposure device may send a first set of data segments of the plurality of data segments to a user device, may determine that the user device has successfully obtained the first set of data segments of the plurality of data segments, and may send, based on determining that the user device has successfully obtained the first set of data segments of the plurality of data segments, a second set of data segments of the plurality of data segments to the user device.

Process 500 may include additional implementations, such as any single implementation or any combination of implementations described below and/or in connection with one or more other processes described elsewhere herein.

In some implementations, the network exposure device may receive a message from a user device of the subset of user devices. For example, the message may correspond to a data segment of the plurality of data segments, and may include a message header, a data segment identifier, a status indicator concerning the data segment, and/or a status explanation concerning the data segment. In some cases, the message may indicate that the user device has received a data segment of the plurality of data segments.

In some implementations, a process may be performed by a network device, such as an AMF (e.g., AMF 315) or an MME (e.g., MME 320). In some implementations, the process may be performed by another device or a group of devices separate from or including the network device, such as a user device (e.g., user device 305), a base station (e.g., base station 310), a network exposure device (e.g., NEF/SCEF 325), and/or a server device (e.g., server device 330).

Such a process may include receiving a first query regarding a set of user devices from a device. For example, the network device (e.g., using processor 420, memory 430, storage component 440, input component 450, communication interface 470, and/or the like) may receive a first query regarding a set of user devices from a device, as described above.

Such a process may include sending, based on the first query, first information concerning a respective location and a respective reachability of each user device of the set of user devices to the device. For example, the network device (e.g., using processor 420, memory 430, storage component 440, output component 460, communication interface 470, and/or the like) may send, based on the first query, first information concerning a respective location and a respective reachability of each user device of the set of user devices to the device, as described above.

Such a process may include receiving a second query regarding a base station associated with the network device from the device. For example, the network device (e.g., using processor 420, memory 430, storage component 440, input component 450, communication interface 470, and/or the like) may receive a second query regarding a base station associated with the network device from the device, as described above.

Such a process may include sending, based on the second query, second information concerning a communication capability of the base station to the device. For example, the network device (e.g., using processor 420, memory 430, storage component 440, output component 460, communication interface 470, and/or the like) may send, based on the second query, second information concerning a communication capability of the base station to the device, as described above.

Such a process may include receiving, after sending the first information and the second information, a plurality of delivery messages destined for a subset of user devices of the set of user devices from the device, wherein each delivery message of the plurality of delivery messages includes a respective data segment. For example, the network device (e.g., using processor 420, memory 430, storage component 440, input component 450, communication interface 470, and/or the like) may receive, after sending the first information and the second information, a plurality of delivery messages destined for a subset of user devices of the set of user devices from the device, as described above. In some implementations, each delivery message of the plurality of delivery messages includes a respective data segment.

Such a process may include sending the plurality of delivery messages to the subset of user devices. For example, the network device (e.g., using processor 420, memory 430, storage component 440, output component 460, communication interface 470, and/or the like) may send the plurality of delivery messages to the subset of user devices, as described above.

Such a process may include receiving an acknowledgement message from a user device of the subset of user devices, wherein the acknowledgment message indicates whether the user device successfully obtained the respective data segment. For example, the network device (e.g., using processor 420, memory 430, storage component 440, input component 450, communication interface 470, and/or the like) may receive an acknowledgement message from a user device of the subset of user devices, as described above. In some implementations, the acknowledgment message indicates whether the user device successfully obtained the respective data segment.

Such a process may include sending the acknowledgement message to the device. For example, the network device (e.g., using processor 420, memory 430, storage component 440, output component 460, communication interface 470, and/or the like) may send the acknowledgement message to the device, as described above.

In some implementations, such a process may further include receiving, after sending the acknowledgment message, an additional delivery message destined for the user device, wherein the additional delivery message includes an additional data segment; sending the additional delivery message to the user device; receiving an additional acknowledgement message from the user device, wherein the additional acknowledgment message indicates whether the user device successfully obtained the additional data segment; and sending the additional acknowledgement message to the device.

In some implementations, such a process may further include receiving, after sending the acknowledgment message, a final acknowledgment message from the user device, wherein the final acknowledgment message indicates that the user device successfully obtained all data segments that collectively comprise a data structure; and sending the final acknowledgment message to the device. In some implementations, this process may further include receiving, after sending the final acknowledgment message, an update acknowledgment message from the user device, wherein the update acknowledgment message indicates whether the user device successfully processed the data structure to update the user device; and sending the update acknowledgment message to the device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:

one or more memories; and one or more processors, communicatively coupled to the one or more memories, to:

obtain, from a computing device, a data structure;

divide the data structure into a plurality of data segments;

obtain, from the computing device, a list of a plurality of user devices;

obtain, from one or more network devices, a respective location and a respective reachability of each user device of the plurality of user devices;

determine, based on the respective location of each user device of the plurality of user devices, a set of user devices, of the plurality of user devices, connected to a base station;

determine a communication capability of the base station;

determine, based on the communication capability, a subset of user devices of the set of user devices and one or more sets of data segments of the plurality of data segments; and send, based on the respective reachability of each user device of the subset of user devices, the one or more sets of data segments to the subset of user devices via the base station.

2. The device of claim 1, wherein the data structure is a software upgrade file image, a security patch, a configuration file, an update file, or one or more messages.

3. The device of claim 1, wherein the one or more processors, when dividing the data structure into the plurality of data segments, are to:

determine an optimal data segment size based on the communication capability of the base station and the respective reachability of each user device of the subset of user devices; and divide, based on the optimal data segment size, the data structure into the plurality of data segments.

4. The device of claim 1, wherein the one or more processors, when obtaining the respective location and the respective reachability of each user device of the plurality of user devices, are to:

obtain, for a user device of the plurality of user devices, at least one of:

a user device identifier;

an identifier of a network device, of the one or more network devices, associated with the user device;

an identifier of the base station associated with the network device;

a reachability status of the user device; or a reachability time of the user device.

5. The device of claim 1, wherein the one or more processors, when determining the set of user devices, of the plurality of user devices, connected to the base station, are to:

determine a network device, of the one or more network devices, that is associated with the base station; and determine a group of user devices that are associated with the network device.

6. The device of claim 1, wherein the one or more processors, when determining the communication capability of the base station, are to:

send a query concerning the communication capability of the base station to a network device, of the one or more network devices, associated with the base station; and receive information concerning the communication capability of the base station from the network device.

7. The device of claim 1, wherein the one or more processors, when sending the one or more sets of data segments to the subset of user devices via the base station, are to:

determine, for a user device of the subset of user devices, a time of reachability of the user device; and send, based on the time of reachability of the user device, the one or more sets of data segments to the user device.

8. The device of claim 1, wherein the one or more processors, when sending the one or more sets of data segments to the subset of user devices via the base station, are to:

send a message to a user device of the subset of user devices, wherein the message corresponds to a data segment of the plurality of data segments, wherein the message includes at least one of:

a message header, the data segment, a data segment identifier, a total number of the plurality of data segments, or a checksum concerning the data segment.

9. The device of claim 1, wherein the one or more processors are further to:

receive a message from a user device of the subset of user devices, wherein the message corresponds to a data segment of the plurality of data segments, wherein the message includes at least one of:

a message header, a data segment identifier, a status indicator concerning the data segment, or a status explanation concerning the data segment.

10. The device of claim 1, wherein the one or more processors are further to:

receive a message from a user device of the subset of user devices, wherein the message indicates that the user device has successfully received a data segment of the plurality of data segments.

11. A non-transitory computer-readable medium storing instructions, the instructions comprising:

one or more instructions that, when executed by one or more processors by a device, cause the one or more processors to:

obtain a data structure associated with instructions;

divide the data structure into a plurality of data segments;

identify a plurality of user devices to receive the plurality of data segments;

determine a respective location and a respective reachability of each user device of the plurality of user devices;

determine, based on the respective location of each user device of the plurality of user devices, a set of user devices of the plurality of user devices;

determine, based on the respective reachability of each user device of the plurality of user devices, a subset of user devices of the set of user devices;

determine, based on the respective reachability of each user device of the plurality of user devices, a plurality of sets of data segments of the plurality of data segments; and send the plurality of sets of data segments to the subset of user devices.

12. The non-transitory computer-readable medium of claim 11, wherein sending the plurality of sets of data segments to the subset of user devices causes a user device of the subset of user devices to execute the instructions associated with the data structure.

13. The non-transitory computer-readable medium of claim 11, wherein the one or more instructions, that cause the one or more processors to identify the plurality of user devices to receive the plurality of data segments, cause the one or more processors to:

receive information concerning the plurality of user devices; and parse the information to determine an identifier of each user device of the plurality of user devices.

14. The non-transitory computer-readable medium of claim 11, wherein the set of user devices are associated with a base station, wherein the one or more instructions, that cause the one or more processors to determine the subset of user devices of the set of user devices, cause the one or more processors to:

determine a communication capability of the base station;

determine, based on the communication capability of the base station, an optimal amount of user devices for the base station to communicate with over a period of time; and determine, based on the optimal amount of user devices, the subset of user devices.

15. The non-transitory computer-readable medium of claim 11, wherein the one or more instructions, that cause the one or more processors to determine the plurality of sets of data segments of the plurality of data segments, cause the one or more processors to:

determine an optimal number of data segments of the plurality of data segments to transmit to the user device; and determine, based on the optimal number of data segments, a set of data segments of the plurality of data segments.

16. The non-transitory computer-readable medium of claim 11, wherein the one or more instructions, that cause the one or more processors to send the plurality of sets of data segments to the subset of user devices, cause the one or more processors to:

send a first set of data segments of the plurality of data segments to a user device of the subset of user devices;

determine that the user device has successfully obtained the first set of data segments of the plurality of data segments; and send, based on determining that the user device has successfully obtained the first set of data segments of the plurality of data segments, a second set of data segments of the plurality of data segments to the user device.

17. A method, comprising:

receiving, by a network device, a first query regarding a set of user devices from a device;

sending, by the network device and based on the first query, first information concerning a respective location and a respective reachability of each user device of the set of user devices to the device;

receiving, by the network device, a second query regarding a base station associated with the network device from the device;

sending, by the network device and based on the second query, second information concerning a communication capability of the base station to the device;

receiving, by the network device and after sending the first information and the second information, a plurality of delivery messages destined for a subset of user devices of the set of user devices from the device, wherein each delivery message of the plurality of delivery messages includes a respective data segment;

sending, by the network device, the plurality of delivery messages to the subset of user devices;

receiving, by the network device, an acknowledgement message from a user device of the subset of user devices, wherein the acknowledgment message indicates whether the user device successfully obtained the respective data segment; and sending, by the network device, the acknowledgement message to the device.

18. The method of claim 17, further comprising:

receiving, after sending the acknowledgment message, an additional delivery message destined for the user device, wherein the additional delivery message includes an additional data segment;

sending the additional delivery message to the user device;

receiving an additional acknowledgement message from the user device, wherein the additional acknowledgment message indicates whether the user device successfully obtained the additional data segment; and sending the additional acknowledgement message to the device.

19. The method of claim 17, further comprising:

receiving, after sending the acknowledgment message, a final acknowledgment message from the user device, wherein the final acknowledgment message indicates that the user device successfully obtained all data segments that collectively comprise a data structure; and sending the final acknowledgment message to the device.

20. The method of claim 19, further comprising:

receiving, after sending the final acknowledgment message, an update acknowledgment message from the user device, wherein the update acknowledgment message indicates whether the user device successfully processed the data structure to update the user device; and sending the update acknowledgment message to the device.

* * * * *